June 12, 1934.  E. H. HOFFMAN  1,962,818
SUN SHIELD FOR THE NOSE
Filed Aug. 17, 1933
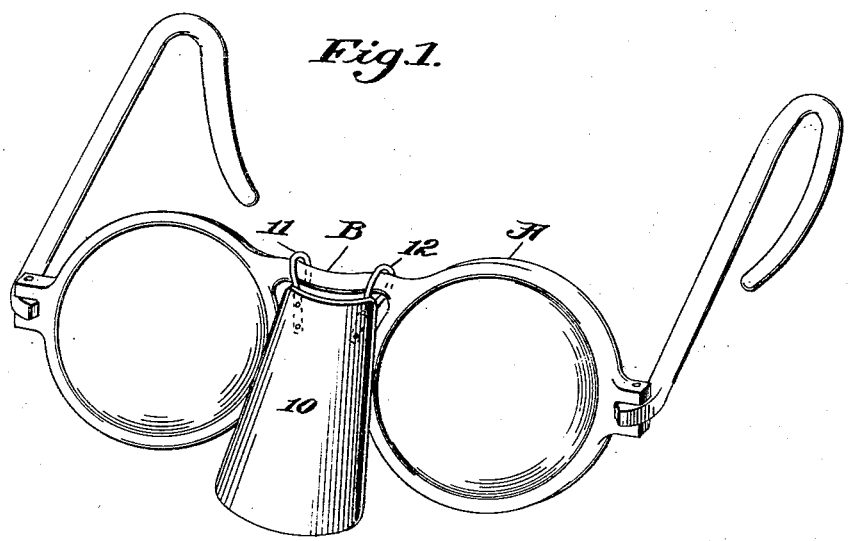
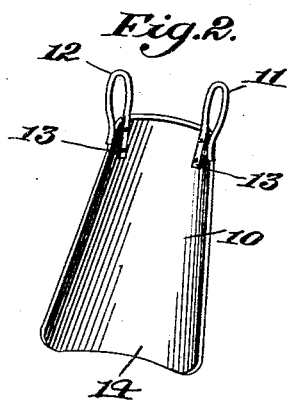
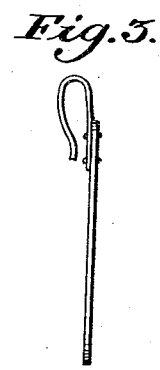
Inventor:
Ethel H. Hoffman
Att'y.

Patented June 12, 1934

1,962,818

UNITED STATES PATENT OFFICE 1,962,818

SUN SHIELD FOR THE NOSE

Ethel H. Hoffman, Washington, D. C.

Application August 17, 1933, Serial No. 685,633

7 Claims. (Cl. 2—12)

This invention is a sun shade or shield for the nose of a person exposed to the sun's rays, and is so constructed as to be readily attachable to the bridge of a spectacle and as readily detached therefrom when desired and readily slipped into the pocket or purse of the user when not in use as a shade or shield.

As is well known, the skin of many persons is so sensitive to the rays of the sun, and more particularly is this the case with the nose, the skin of which is very sensitive to the sun's rays, and becomes blistered and unsightly, not only resulting in discomfort, but becomes very painful.

The primary object of the invention, therefore, is to provide a screen or shield that will be neat in appearance and light in weight, cheap in cost of manufacture and readily attached or detached from the bridge of a spectacle, having sight corrective lenses or smoked or colored lenses, such as are commonly used by persons to modify the rays of the sun when exposed thereto.

The device will be found to be particularly adaptable and useful to persons playing tennis, golf or fishing, boating, baseball or any sport or anything that exposes them to the sun's rays and can be cheaply made of any suitable light weight material, such for instance, as celluloid, or a light weight frame which may be covered with any suitable material and preferably so shaped as to conform generally to the contour of the nose, though it may be perfectly flat, if desired, the only requisite being that it shall have such transverse and longitudinal dimensions as to effectively shield the nose from the rays of the sun.

The device may be permanently attached to the bridge of a spectacle or provided with hook-shaped spring clamps for engaging the bridge of the spectacle; the width of the eye of the hook preferably should be such as to cause the hook to engage the bridge of the spectacle in a clamping action sufficient to retain the bridge in an upwardly tilted position in order to obtain a free circulation of air between the bridge and the nose of the wearer, if so desired.

The invention will be hereinafter set forth and particularly pointed out in the claims:

In the accompanying drawing, Figure 1 is a perspective view showing the invention attached to a spectacle.

Figure 2 is a bottom elevation of the shield per se, and

Figure 3 is a longitudinal section of the shield per se.

Like reference characters indicate like parts throughout the several views of the drawing.

A indicates a spectacle of the usual construction having secured to the bridge B the shield 10, which is provided at its upper end with spaced apart spring hook-like members 11 and 12 for engaging the bridge B in a clamping action which results in the clamps engaging the bridge B in a pivotal relation under spring tension, thereby permitting the screen to be raised upwardly and out of contact with the nose which will permit the free circulation of air between the nose and the screen to prevent irritation or scalding, the spring hook-like members 11 and 12 being secured to the shield 10 by rivets 13 or in any other suitable manner. Shield 10 is arcuate in cross section as at 14 throughout its entire length in order to cause it to conform to the general contour of the nose.

From the foregoing description of the device, it will be readily seen that the shield 10 may be quickly attached to the bridge B of the spectacle A by passing the hooks 11 and 12 over the bridge B of the spectacle A with the under side of the shield 10 turned downwardly with relation to the nose before placing the bridge B of the spectacle on the nose in the usual manner, and the shield 10 may be readily removed from the bridge B and placed in the pocket or purse of the user when its use is not required.

It will be understood, of course, that the hooks 11 and 12 may be made of any non-spring material to function merely as an ordinary hook to support the shield 10 from the spectacle A.

The modification shown in Figure 3 may, if desired, be made perfectly flat and of any suitable material.

Having thus explained the nature of the invention and described an operative manner of constructing and using the same, although without attempting to set forth all of the ways in which it may be made, or all of the forms of its use, what is claimed is:

1. A nose shield having means for pivotally engaging the bridge of a spectacle.

2. A nose screen having spring hook-shaped clamps for engaging a spectacle.

3. A nose screen having hook-shaped spring clamps for engaging the bridge of a spectacle.

4. A nose shield narrower at one of its ends than at the other of its ends, hook-shaped clamps affixed to the first mentioned end for securing the shield to the bridge of a spectacle.

5. A nose screen arcuately shaped in cross section having spring clamps for engaging the bridge of a spectacle affixed to one of the ends of the screen.

6. A flat nose screen having spring clamps secured to one of its ends for securing the screen to the bridge of a spectacle.

7. A flat nose screen being broader at one of its ends than at the other of its ends, spring clamps secured to the last mentioned end for adjustably supporting the screen from the bridge of a spectacle.

ETHEL H. HOFFMAN.